(12) United States Patent
Subramanian et al.

(10) Patent No.: US 11,948,024 B2
(45) Date of Patent: Apr. 2, 2024

(54) AUTOMATED DYNAMIC PAYLOAD TESTING OF ODATA APIS

(71) Applicant: SAP SE, Walldorf (DE)

(72) Inventors: Krishnan Harihara Subramanian, Bangalore (IN); Dinesh Bhandarkar, Bangalore (IN); Jerin James, Kottayam (IN); Madhu Tirumalasetti, Bangalore (IN)

(73) Assignee: SAP SE, Walldorf (DE)

( * ) Notice: Subject to any disclaimer, the term of this patent is extended or adjusted under 35 U.S.C. 154(b) by 83 days.

(21) Appl. No.: 17/530,168

(22) Filed: Nov. 18, 2021

(65) Prior Publication Data

US 2023/0153184 A1 May 18, 2023

(51) Int. Cl.
*G06F 7/06* (2006.01)
*G06F 9/54* (2006.01)
*G06F 16/22* (2019.01)
*H04L 67/02* (2022.01)

(52) U.S. Cl.
CPC .......... *G06F 9/547* (2013.01); *G06F 16/2282* (2019.01); *H04L 67/02* (2013.01)

(58) Field of Classification Search
CPC ....... G06F 9/547; G06F 16/2282; H04L 67/02
See application file for complete search history.

(56) References Cited

U.S. PATENT DOCUMENTS

| | | | |
|---|---|---|---|
| 10,936,384 B1 | 3/2021 | Mamidela | |
| 2016/0072927 A1* | 3/2016 | Xue | H04L 69/18 709/203 |
| 2017/0177650 A1* | 6/2017 | Devine | G06F 16/2455 |
| 2017/0300402 A1* | 10/2017 | Hoffner | G06F 11/3684 |
| 2019/0188288 A1* | 6/2019 | Holm | G06F 16/289 |

OTHER PUBLICATIONS

Nuno Laranjeiro et al. discloses "A Black Box Tool for Robustness Testing of REST Services" Received Jan. 12, 2021, accepted Jan. 29, 2021, date of publication Feb. 2, 2021. (Year: 2021).*
Oasis, "OData Version 4.0 Part 1: Protocol," <http://docs.oasis-open.org/odata/odata/v4.0/os/part1-protocol/odata-v4.0-os-part1-protocol.html>, 67 pages (Feb. 24, 2014).

(Continued)

*Primary Examiner* — Kevin L Young
*Assistant Examiner* — Abdou K Seye
(74) *Attorney, Agent, or Firm* — Klarquist Sparkman, LLP

(57) ABSTRACT

Technologies are described for automated payload testing of open data protocol (OData) application programming interfaces (APIs). For example, metadata describing an OData service can be retrieved from the OData service. The OData service can then be tested for one or more entities of the OData service. Testing can be performed by dynamically creating various payloads for testing the entities of the OData service and the OData operations supported by the entities. Results of executing the payloads can be received and evaluated to determine whether a given payload was executed successfully by the OData service. Results of the testing (e.g., indications of success or failure) can be output.

20 Claims, 7 Drawing Sheets

(56) References Cited

OTHER PUBLICATIONS

I2tutorials.com, "Maxima vs Minima and Global vs Local in Machine Learning," <https://www.i2tutorials.com/maxima-vs-minima-and-global-vs-local-in-machine-learning/>, 8 pages (May 29, 2019).
Towards Data Science, "Optimization Techniques—Simulated Annealing," <https://towardsdatascience.com/optimization-techniques-simulated-annealing-doa4785alde7>, 9 pages (Apr. 20, 2020).
Learn with Panda, "How to Use Simulated Annealing Solver to Solve Optimization Problems," <https://learnwithpanda.com/2020/12/20/how-to-use-simulated-annealing-solver-to-solve-optimization-problems/>, 4 pages (Dec. 20, 2020).
Anas Arram, Masri Ayob and Mohammad Zakree, "Comparative Study of Meta-Heuristic Approaches for Solving Traveling Salesman Problems," Asian Journal of Applied Sciences, 7: 662-670, 10 pages (Sep. 23, 2014).
Abhilash Pradhan, "Using Postman For OData / Netweaver Gateway Testing CRUD Methods," <https://blogs.sap.com/2020/03/27/using-postman-for-odata-netweaver-gateway-testing-crud-methods/>, 9 pages (Mar. 27, 2020).
Jerry Wang, "Measure the performance of your OData service," <https://blogs.sap.com/2016/01/13/measure-the-performance-of-your-odata-service/>, 7 pages (Jan. 13, 2016).
Melanie Reinwarth, "Architecture of the eCATT OData Test Automation," <https://blogs.sap.com/2015/06/09/architecture-of-the-ecatt-odata-test-automation/>, 4 pages (Jun. 9, 2015).

\* cited by examiner

Figure 2

```
<EntityContainer Name="API_SERVICE_ORDER_SRV_Entities" m:IsDefaultEntityContainer="true" sap:message-scope-supported="true" sap:supported-formats="atom json xlsx">
    <EntitySet Name="A_ServiceOrder" EntityType="API_SERVICE_ORDER_SRV.A_ServiceOrderType" sap:deletable="false" sap:content-version="1"/>
    <EntitySet Name="A_ServiceOrderConfirmation" EntityType="API_SERVICE_ORDER_SRV.A_ServiceOrderConfirmationType" sap:creatable="false" sap:updatable="false" sap:deletable="false" sap:content-version="1"/>
    <EntitySet Name="A_ServiceOrderDefect" EntityType="API_SERVICE_ORDER_SRV.A_ServiceOrderDefectType" sap:content-version="1"/>
    <EntitySet Name="A_ServiceOrderItem" EntityType="API_SERVICE_ORDER_SRV.A_ServiceOrderItemType" sap:content-version="1"/>
    <EntitySet Name="A_ServiceOrderItemConfirmation" EntityType="API_SERVICE_ORDER_SRV.A_ServiceOrderItemConfirmationType" sap:creatable="false" sap:updatable="false" sap:deletable="false" sap:content-version="1"/>
    <EntitySet Name="A_ServiceOrderItemPriceElement" EntityType="API_SERVICE_ORDER_SRV.A_ServiceOrderItemPriceElementType" sap:deletable="false" sap:content-version="1"/>
    <EntitySet Name="A_ServiceOrderItemRefObject" EntityType="API_SERVICE_ORDER_SRV.A_ServiceOrderItemRefObjectType" sap:updatable="false" sap:content-version="1"/>
    <EntitySet Name="A_ServiceOrderItemText" EntityType="API_SERVICE_ORDER_SRV.A_ServiceOrderItemTextType" sap:content-version="1"/>
    <EntitySet Name="A_ServiceOrderPersonResp" EntityType="API_SERVICE_ORDER_SRV.A_ServiceOrderPersonRespType" sap:content-version="1"/>
    <EntitySet Name="A_ServiceOrderPriceElement" EntityType="API_SERVICE_ORDER_SRV.A_ServiceOrderPriceElementType" sap:deletable="false" sap:content-version="1"/>
    <EntitySet Name="A_ServiceOrderRefObject" EntityType="API_SERVICE_ORDER_SRV.A_ServiceOrderRefObjectType" sap:updatable="false" sap:content-version="1"/>
```

```
<EntityType Name="A_ServiceOrderType" sap:label="Service Order" sap:content-version="1"/>
  <Key>
    <PropertyRef Name="ServiceOrder" />
  </Key>
  <Property Name="ServiceOrder" Type="Edm.String" Nullable="false" MaxLength="10" sap:display-format="UpperCase" sap:label="Transaction ID" />
  <Property Name="ServiceOrderType" Type="Edm.String" MaxLength="4" sap:display-format="UpperCase" sap:label="Transaction Type" sap:quickinfo="Business Transaction Type" />
  <Property Name="ServiceOrderUUID" Type="Edm.Guid" sap:label="Object GUID" sap:quickinfo="GUID of a CRM Order Object" />
  <Property Name="ServiceOrderDescription" Type="Edm.String" MaxLength="40" sap:label="Transaction Descr." sap:quickinfo="Transaction Description" />
  <Property Name="ServiceObjectType" Type="Edm.String" MaxLength="10" sap:display-format="UpperCase" sap:label="Trans. Cat." sap:quickinfo="Business Trans. Cat." />
  <Property Name="Language" Type="Edm.String" MaxLength="2" sap:label="Language" sap:quickinfo="Language Key of Description" />
  <Property Name="ServiceDocumentPriority" Type="Edm.String" MaxLength="1" sap:display-format="NonNegative" sap:label="Priority" sap:quickinfo="Activity Priority" />
  <Property Name="RequestedServiceStartDateTime" Type="Edm.DateTimeOffset" Precision="0" sap:label="Service Req. Start" sap:quickinfo="Service Request Start Date" />
  <Property Name="RequestedServiceEndDateTime" Type="Edm.DateTimeOffset" Precision="0" sap:label="Service Request Due" sap:quickinfo="Service Request Due Date" />
  <Property Name="ServiceDocChangedDateTime" Type="Edm.DateTimeOffset" Precision="0" sap:label="Changed On" sap:quickinfo="Changed At" sap:creatable="false" sap:updatable="false" />
  <Property Name="ServiceDocumentTemplateType" Type="Edm.String" MaxLength="1" sap:display-format="UpperCase" sap:label="Templ. Type" sap:quickinfo="Template Type of CRM Transaction" />
```

300

US 11,948,024 B2

AUTOMATED DYNAMIC PAYLOAD TESTING OF ODATA APIS

BACKGROUND

Developing and maintaining a modern web service requires a significant amount of testing. For example, a typical OData service may support many entities, with each entity having supported operations to create, read, update, and/or delete resources within the OData service. Furthermore, each entity has associated fields, some of which may be required fields, while other fields are optional. Therefore, testing the OData service can be a time-consuming resource intensive process, due to the number of entities, operations, fields, and values involved.

In some solutions, an OData service is tested using a manual process in which the user manually creates test cases to test various entities of the OData service. Once the user has created the test payload, the user would execute the test payload against the OData service API. The user would then review the results (e.g., success or failure codes). The user would then repeat the manual process to test additional entities and/or OData services. However, such manual testing suffers from a number of issues. For example, such manual testing may only test a small number of requests (e.g., only a read request using a pre-determined number of fields for a given entity), and therefore the OData service may not be fully tested. In addition, if the same test needs to be performed in different systems (e.g., different SAP® systems), then the user would need to manually identify the data and perform similar operations (e.g., create, read, update, and/or delete operations) for each system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various technologies are described herein for automated payload testing of open data protocol (OData) application programming interfaces (APIs). For example, metadata describing an OData service can be retrieved from the OData service. The OData service can then be tested for one or more entities of the OData service. Testing can be performed by dynamically creating various payloads for testing the entities of the OData service and the OData operations supported by the entities. Results of executing the payloads can be received and evaluated to determine whether a given payload was executed successfully by the OData service. Results of the testing (e.g., indications of success or failure) can be output.

BRIEF DESCRIPTION OF THE DRAWINGS

FIG. 2 depicts a first portion of example metadata for an example OData service.

FIG. 3 depicts a second portion of the example metadata for the example OData service.

DETAILED DESCRIPTION

Overview

Figure 1:
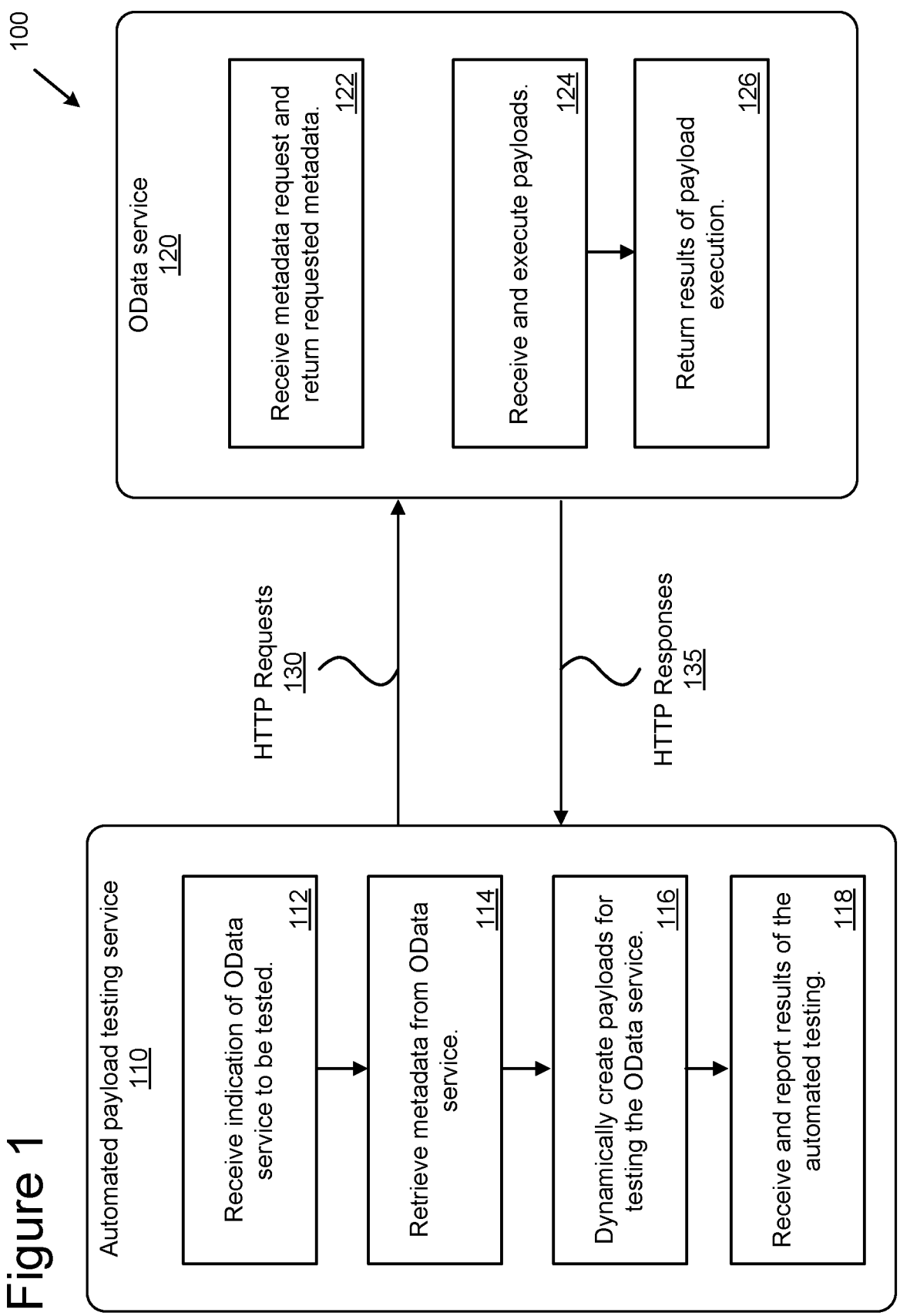
FIG. 1 is an example environment that provides automated testing of open data protocol (OData) application programming interfaces (APIs) using dynamically created payloads.

The following description is directed to technologies for automated payload testing of open data protocol (OData) application programming interfaces (APIs). For example, an indication of an OData service can be received (e.g., from a user via a graphical user interface). Metadata describing the OData service can be retrieved from the OData service (e.g., describing the entities, fields, and field data types supported by the OData service). The OData service can then be tested for one or more entities of the OData service. Testing can be performed by dynamically creating various payloads for testing the entities of the OData service and the OData operations supported by the entities (e.g., create, read, update, and/or delete operations). Results of executing the payloads can be received and evaluated to determine whether a given payload was executed successfully by the OData service. Results of the testing (e.g., indications of success or failure) can be output. The OData service operates according to an OData protocol (e.g., using the OData version 4.0 protocol or another version of the OData protocol; the OData protocol is provided by OASIS®).

In typical testing solutions, the user manually creates test cases to test the APIs of various OData services. For example, to test a particular OData service API, the user would create a test payload that is specific to the OData service API. When creating the test payload, the user would manually select the entity or entities to include in the payload. The user would also manually select the fields to include for each entity and enter values for the fields. Once the user has created the test payload, the user would execute the test payload against the OData service API. The user would then review the results (e.g., success or failure HTTP status codes). The user would repeat the manual process to test additional payloads and/or OData services.

Such typical testing solutions for OData services suffer from a number of problems. For example, an OData service typically has many possible inputs (e.g., many possible fields and associated values). Therefore, it may be nearly impossible to fully test all the possible inputs for a given OData service or all the entities within an OData service. In addition, such manual testing of OData services can be error prone due to the manual creation of various test payloads. Finally, such manual testing is inefficient and time consuming.

The technologies described herein provide improvements over such typical testing solutions. For example, the automated payload testing solutions for testing OData services and associated APIs are performed without user intervention. As a result, the OData services can be tested in an efficient and accurate manner. For example, payloads can be dynamically created for testing each supported OData operation for each of one or more entities of the OData service.

Furthermore, the payloads can be automatically created to test various combinations of fields. Field values can also be automatically generated for the payloads. Test results can be automatically received and evaluated. Based on the test results, successful payloads can be saved and re-used later (e.g., for periodic testing). These automated testing solutions save time and increase accuracy of testing.

Example Environments for Automated Testing of OData APIs

In the technologies described herein, environments can be provided for testing OData APIs. For example, payloads can be automatically created to test various aspects of an OData service, and successful payloads can be saved for later testing.

FIG. 1 depicts an example environment 100 that provides automated testing of OData APIs using dynamically created payloads. The example environment 100 includes an automated payload testing service 110 and an OData service 120. The automated payload testing service 110 communicates with the OData service 120 via a computer network (e.g., comprising the Internet). The automated payload testing service 110 can be implemented using various computer software and/or hardware resources (e.g., computer servers, cloud computing resources, etc.). In some implementations, a user accesses the automated payload testing service 110 via a graphical user interface (e.g., via a web browser running on the user's device). The graphical user interface supports configuring and running payload tests against the OData service 120, reporting results, and other automated testing functionality. In general, the automated payload testing service 110 can be used to test any number of OData services, including OData service 120.

The OData service 120 is a service that is accessible via an API and that provides access to resources (e.g., entities) via HTTP request methods. For example, the OData service 120 could be a service for managing service orders, service contracts, service confirmations, billing, invoicing, etc. The OData service 120 can be implemented using various computer software and/or hardware resources (e.g., web server resources, computer servers, cloud computing resources, etc.).

The OData service 120 supports performing OData operations for creating, reading, updating, and deleting resources (e.g., database records and/or other resources), which are also referred to as CRUD operations. Each OData operation is performed using a different HTTP request method. For example, the create operation is performed by the HTTP POST request method, the read operation is performed by the HTTP GET request method, the update operation is performed using the HTTP PUT or PATCH request method, and the delete operation is performed using the HTTP DELETE request method.

The automated payload testing service 110 supports performing various operations for automated testing of OData services (e.g., OData service 120) using dynamically created payloads. In some implementations, the automated payload testing service 110 performs one or more of the operations depicted at 112, 114, 116, and 118. For example, at 112, the automated payload testing service 110 receives an indication of an OData service to be tested. For example, the indication of the OData service to be tested can be received via a graphical user interface. In some implementations, a service execution sequence is received via the graphical user interface. The service execution sequence indicates a number of OData services that are to be tested (e.g., including a sequence in which the OData services are to be tested). For example, using the graphical user interface, the user could specify that the service contract OData service be tested first, followed by the service order OData service, followed by the service confirmation OData service, and finally the billing service OData service.

At 114, metadata describing the OData service is retrieved from the OData service 120. The metadata is requested using an HTTP request, as depicted at 130, and received using an HTTP response, as depicted at 135. In some implementations, the metadata is obtained using an HTTP GET request method to retrieve the "$metadata" resource describing the OData service 120.

At 116, one or more payloads are dynamically created for testing the OData service 120. The payloads are generated based on the retrieved metadata. For example, one or more of the entities of the OData service 120 can be tested for each of one or more available OData operations. For example, a particular entity could support create, read, and update OData operations (but not delete OData operations). A payload could be generated to test the OData service for each of creating, reading, and updating the particular entity (e.g., using various fields and field values as indicated by the metadata), with a separate payload generated for each OData operation.

At 118, results of the automated testing are received and reported. For example, the success or failure of a given payload can be determined based on the HTTP response status code received from the OData service 120 upon executing the given payload. In some implementations, an HTTP response code in the 400s or 500s indicates failure (e.g., a network error, an error processing the payload, etc.), while an HTTP response code in the 200s indicates that the payload was successfully executed. In some implementations, success or failure of a given payload is also based on a performance result (e.g., the time taken to process the payload). For example, the payload is determined to be successfully executed when the HTTP response code is in the 200s and the performance result is less than a performance threshold (e.g., the time taken to process the payload is less than a threshold time). In some implementations, a performance result less than the performance threshold indicates a performance issue (e.g., which can be reported), but not failure of the payload.

The OData service 120 receives requests from the automated payload testing service 110, executes (processes) the requests, and returns responses to the automated payload testing service 110. In some implementations, the OData service 120 performs one or more of the operations depicted at 122, 124, and 126. For example, at 122, the OData service receives a metadata request from the automated payload testing service 110 (via an HTTP request, as depicted at 130). The OData service 120 obtains the metadata and returns it to the automated payload testing service 110 (via an HTTP response, as depicted at 135).

At 124, the OData service receives and executes payloads that are received from the automated payload testing service 110 (via HTTP requests, as depicted at 130). The OData service can receive many payloads, each testing a specific combination of fields, entities, and/or OData operations. At 126, the OData service returns results from executing the received payloads. For example, if the execution was successful, then the OData service 120 can return an HTTP status code in the 200s (via an HTTP response, as depicted at 135) to the automated payload testing service 110.

Example Metadata for OData Service

In the technologies described herein, metadata can be obtained that describes an OData service. In some implementations, the metadata is obtained by executing a uniform resource identifier (URI) that calls the API for the OData service, using an HTTP GET request method, with the "$metadata" address relative to the root URI of the OData service.

The metadata for a given OData service describes the structure of the API for the OData service and its resources. The structure includes the definition of the entities supported by the OData service. The structure also includes definitions of the fields and the field data types for the entities supported by the OData service.

FIG. 2 depicts a first portion of example metadata 200 for an example Service Order OData service. Specifically, the first portion of the example metadata 200 defines various entities supported by the OData service, including a service order entity ("ServiceOrder"), a service order confirmation entity ("ServiceOrderConfirmation"), a service order item entity ("ServiceOrderItem"), and other entities. The OData operations that are supported by the various entities are also defined. Specifically, all OData operations (create, read, update, and delete) are supported by default for a given entity unless defined otherwise. For example, the service order entity supports create, read, and update OData operations, but not the delete OData operation due to the deletable="false" entry in the example metadata 200 for the service order entity. As another example, for the service order confirmation entity, only the read OData operation is supported because the create, update, and delete operations are designated as "false" in the example metadata 200.

FIG. 3 depicts a second portion of the example metadata 300 for the example Service Order OData service. Specifically, the second portion of the example metadata 300 contains field definitions for some of the fields associated with the service order entity. For example, some of the depicted fields include service order type ("ServiceOrderType"), service order description ("ServiceOrderDescription"), and service request start date ("RequestedServiceStartDateTime"). Each of the fields is also associated with a field data type. For example, the service order type and service order description fields have the string data type, while the service request start date field has the date/time data type.

Example Automated Creation and Execution of Payloads

In the technologies described herein, payloads (also referred to as test payloads) are created in an automated manner to test OData services. In general, payloads can be dynamically created based on metadata describing a given OData service. The metadata describes the fields and field data types for the various entities supported by the OData service.

In some implementations, a payload is automatically and dynamically created based, at least in part, on existing data. For example, the existing data can be obtained from database tables and/or database views (one type of database view is a core data service (CDS) view that is supported by SAP HANA® database systems). The existing data can be actual data (e.g., transactional data and/or master data used in a database system). Using actual data, when available, for creating test payloads provides advantages because it can ensure that the data used for the fields of the test payload are compatible with the OData service.

In some implementations, a payload is automatically and dynamically created based, at least in part, on generated data. For example, generated data can be used when actual data is not available (e.g., there are no database and/or view records with the fields needed for the payload). Generated data can be automatically generated for a given field based on the field data type. For example, if the field is an integer field, then an integer value can be automatically generated (e.g., a default integer value of zero or a randomly generated integer value). As another example, if the field is a string field with a maximum length of four, then a string can be automatically generated (e.g., a default four-character string such as "abed", an empty string, or a random string with up to four characters). In some implementations, field values are auto-generated (e.g., a unique identifier may be generated when a new record is inserted). In this situation, the field value can be left blank, or a default value can be used (e.g., a value of zero because the value will be ignored or replaced with the auto-generated value).

In some implementations, one or more of the fields are designated as key fields. In this case, the one or more key fields are included in the payload as required fields.

In some implementations, testing of the OData service is performed using an iterative procedure. When testing a given entity of the OData service, the iterative procedures first creates a payload using only the key fields (e.g., as indicated by the metadata). For example, when testing a particular entity, only one or two fields may be key fields. A payload is then created with just the key fields and associated field values (using actual data or generated data). The payload is then executed by sending it to the OData service for processing as an OData request. If the OData request is successful (e.g., based on the HTTP response code, performance result, and/or other indications of success or failure), then the test is deemed a success and the iterative procedure ends. However, if the OData request is not successful, then one or more additional iterations are performed until the OData request is successful. Each additional iteration adds another field (with its associated field value) to the payload, creating an updated payload, which is sent to the OData service in another OData request. For example, if the first iteration creates a payload with one required field, which results in a failed request, then the second iteration would add one additional field to the payload (which would now have two fields). If the second iteration results in a failed request, then a third iteration would add another additional field to the payload. The iterations would continue until a successful result is obtained.

In some implementations, the iterative procedure is performed using permutations of available fields. The first iteration is still performed using only the required field(s). However, additional iterations are performed using permutations of the remaining (non-key) fields. For example, iterations can be performed for permutations of one additional field, followed by iterations for permutations of two additional fields, and so on.

Using the iterative procedure, an OData service can be tested even when the automated payload testing service and/or the user does not know which fields may be needed for a successful payload. Once a successful payload is found using the iterative procedure, it can be saved for use later (e.g., in subsequent periodic and/or triggered testing).

In some implementations, field values are automatically created (e.g., for fields with no actual data) according to a simulated annealing (SA) algorithm. The simulated annealing algorithm is applied to the OData field values as follows. First, within the OData API, entities are arranged by their supported OData operations. Specifically, entities that support all operations (create, read, update, and delete) are listed first, followed by entities that support update and delete, followed by entities that support only read operations. An example of OData entities in sorted order is:

A_ServiceOrder→This is the root
    A_ServiceOrderItems→This is the child entity
        A_ServiceOrderItemRefObect→These are child entities of Item entities
        A_ServiceItemPricingElement→These are child entities of Item entities
        A_ServiceItemReferenceContract→These are child entities of Item entities
    A_ServiceReferenceObject→This is the child entity
    A_ServicePricingElement→This is the child entity In the example algorithm that uses simulated annealing, the following OData operations can be executed:
1. Create entity
2. Create deep entity
3. Update entity
4. Read entity
5. Delete entity Next, the initial state is defined as the order of the entities as they are defined in the metadata. Scores are determined, with each OData operation adding +1 to the score. For example, if an entity supports all four operations, +4 is added. Therefore, if an entity only has a read operation, +1 is added to its score. Next, the fields that are listed within a given entity that are also listed in other entities will also increase the score by +1. In the below example, the SalesOrganization field is present in A_ServiceOrder and A_ServiceOrderItem. Hence +1 is added to A_ServiceOrder and A_ServiceOrderItem entities.

Figure 4:
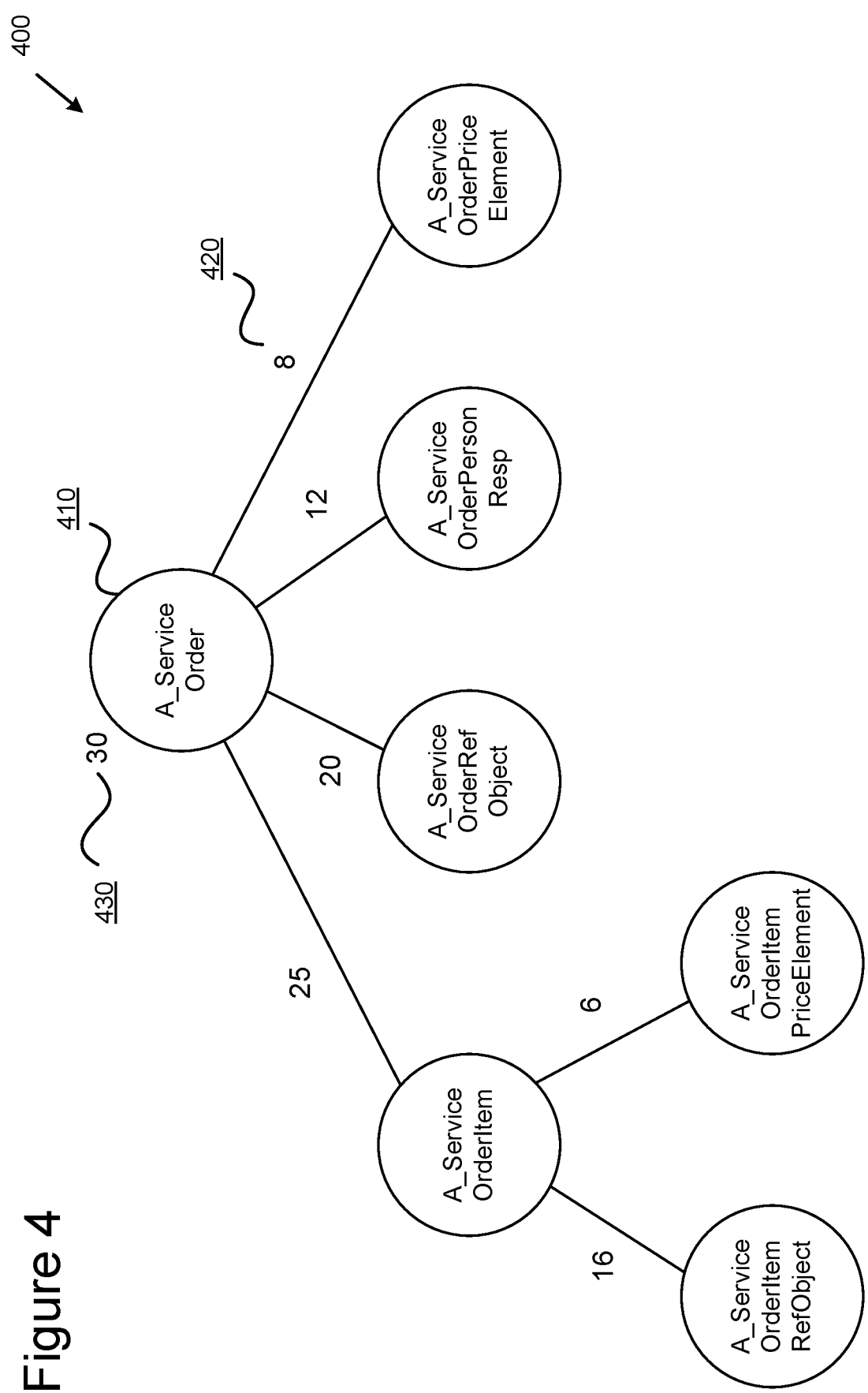
FIG. 4 depicts an example entity tree structure with scores.

Using this configuration (with scores), a tree structure is constructed with scores for the different entities. The root is always the main entity (in this example, the root is A_ServiceOrder). FIG. 4 depicts an example tree structure 400 corresponding to this example. The tree structure 400 depicts some of the entities used in this example. For example, the root node A_ServiceOrder is depicted at 410. In addition, example scores are also depicted in the example tree structure 400. For example, the node
    A_ServiceOrderPriceElement has a score of 8, as depicted at 420, and the root node
    A_ServiceOrder, which is depicted at 410, has a score of 30, as depicted at 430.

In this example algorithm that uses simulated annealing, the algorithm is performed according to the following pseudocode:
1. Set the maximum number of iterations I=number of entities*1000 (constant)
2. Set the starting temperature T=1000 (initial temperature constant)
3. Set coolingRate=0.01 (constant defined)
4. Generate the initial solution S=S₀→The main entity is resolved using f(x)
5. A random neighbor is then selected
Initial_temperature=1000
Final_temperature=0.1
objEntity best=new Entity (mainentity)
current_temperature=initial_temperature

```
// Loop until the entities are cooled
while (initial_temperature > final_temperature) {
    // Get random position in the entity which is immediate child of current solution/entity
    Neighbor_Solution = random_entity (get_neighbor_entity)
    // Get energy of solution
    Cost_diff = get_cost (best) – get_cost (neighbor)
    // If the new solution is better then accept it
    If cost_diff > 0
        Solution = neighbor
    // If the new solution is not better, accept it with a probability of e(-cost/temp)
    Else
        if random.uniform (0, 1) < math.exp (-Cost_diff / current_temperature):
            solution = neighbor
    Endif
    // Cool entities
    current_temperature = current_temperature – coolingRate
}
```

With the example algorithm that uses simulated annealing, the order in which the entities need to be executed is derived. The first state of payload generation begins with the root entity. The key fields are given highest priority and form part of the root node. Next, the fields that are repeated in different entities are given $2^{nd}$ priority. Then, fuzzy search on the fields that assigns 0.4 (40%) approximation to the other fields in the entity is given $3^{rd}$ priority. Then, the other fields form the leaf nodes of the $3^{rd}$ priority nodes.

In this example, for A_ServiceOrder CDS view, ServiceOrder is 1" priority, followed by SalesOrganization and Division, followed by RequestedStartDateTime and RequestedEndDateTime as they have similar fields (due to fuzzy search) in A_ServiceOrderItem CDS View, such as RequestedServiceOrderItemStartDateTime and RequestedServiceOrderItemEndDateTime. ReferenceServiceOrderTemplate comes at the end.

In summary, the entities are sorted by checking whether any of the $1^{st}$ to $3^{rd}$ priority fields are read only, update only, or create only fields. The fields that have no restrictions are listed at the top or moved from the current priority to the next higher level priority. If any fields have restrictions of read only, update only, or create only then they are move to the next lower priority.

Next, for each field based on the field data type, random values are generated based on the field data types. For key fields, they can be generated using the underlying business logic. For example, fields that use auto-assigned values (e.g., unique identifiers) a blank value or 0000 (e.g., for GUID fields) can be used (e.g., because the value will be overwritten with an auto-generated unique value). In some implementations, a given field has an associated value help reference, which can be retrieved and used to assign the value. The test is then performed for the create (POST) operation to determine whether it is successful (HTTP status code in the 200s). If the test is successful, the algorithm moves to next entity using the example algorithm as defined in the above simulated annealing pseudocode.

However, if the test is not successful (status code not in the 200s), then the algorithm retrieves new fields from the $1^{st}$ priority list and checks different permutations to determine whether any values result in a successful test (HTTP status code in the 200s). If there are no successful permutations, then the algorithm moves to the $2^{nd}$ priority list and again tries with different combinations of values. The algorithm continues until a successful test is found. If all tests fail, then the user can be informed. There can be various reasons why all tests fail. For example, the OData API may not be working as expected, incorrect logic may be implemented, or the payload generation procedure may not be able to generate a successful payload. Various payloads can be stored (e.g., by the end user) in the OData API testing database (e.g., for later use or modification).

The following depicts an example payload for testing the Service Order OData service. The example payload contains two entities, a service order entity and a service order item entity. In the example payload, there are a number of fields that use existing data. For example, the service order type field (which is a key field) is using existing master data for the "SVO1" value. There are also a number of fields that use generated data. For example, the service order description field uses a generated value of "Test".

```
{
    "ServiceOrderType": "SVO1",
    "ServiceOrderDesription": "Demo",
    "RequestedServiceStartDateTime": "/Date(1627027308705)/",
    "RequestedServiceEndDateTime": "/Date(162786508705)/",
    "SalesOrganization": "1020",
    "DistributionChannel": "18",
    "Division": "00",
    "SalesOffice": " ",
    "SalesGroup": " ",
    "SoldToParty": "10039",
    "RefServiceOrderTemplate": "8000000247",
    "ServiceOrderIsReleased": " ",
    "to_Item": [
      {
        "ServiceOrderItem": "000010",
        "Product": "SO220XF001",
        "Quantity": "1",
        "QuantityUnit": "PC",
        "BillableControl": " ",
        "ParentServiceOrderItem": "000000",
        "RefServiceOrderTemplate": "8000000247",
        "RefServiceOrderTemplateItem": "000010",
        "ServiceOrderItemIsReleased": " "
      }
    ]
]
```

In some implementations, successful payloads are saved for use in later testing. For example, when a given payload is successfully executed by the OData service, the given payload can be saved. The saved payload can then be used later to test the OData service on a periodic basis (e.g., on a daily basis) to confirm that the OData service is still operating correctly. Subsequent testing using the saved payload can also be triggered based on other conditions. For example, subsequent testing can be triggered based on a code change to a given OData service. For example, upon an update to a given OData service (e.g., deployment of a new code version), saved payloads associated with the OData service can be executed to test the functionality of the updated OData service.

In some implementations, payloads are created for testing OData operations in a specific order. For example, the first operation (if supported for a given entity) can be a read (e.g., HTTP GET) operation. A successful read operation will return the data requested by the associated payload (e.g., specific database values or records). The second operation (if supported for a given entity) can be a create (e.g., HTTP POST) operation. A successful create operation will return an indication that the data was successfully created (e.g., that a specific record indicated by the associated payload was created in the database). The third operation (if supported for a given entity) can be an update (e.g., HTTP PUT or PATCH) operation. For an update operation, the associated payload will indicate the data to be updated (e.g., a field value of a record created by the previous create operation or an existing field value of an existing record). Success can be determined by reading the updated data (e.g., in a subsequent read request) to confirm that the data was updated. The fourth operation (if supported for a given entity) can be a delete (e.g., HTTP DELETE) operation. For a delete operation, the associated payload will indicate the data to be deleted (e.g., a particular database record). Success can be determined by trying to read the data that was deleted (e.g., to confirm that the particular database record has been deleted from the database). In some implementations, the order of the first and second operations is reversed. For example, if the read operation is performed first but fails because there is no data to be read (e.g., a particular database table is empty), then the create operation can be performed first to create data which is then read by the read operation.

Methods for Testing OData APIs

In the technologies described herein, methods can be provided for testing OData APIs. For example, payloads can be automatically and dynamically created for testing various entities of an OData service.

Figure 5:
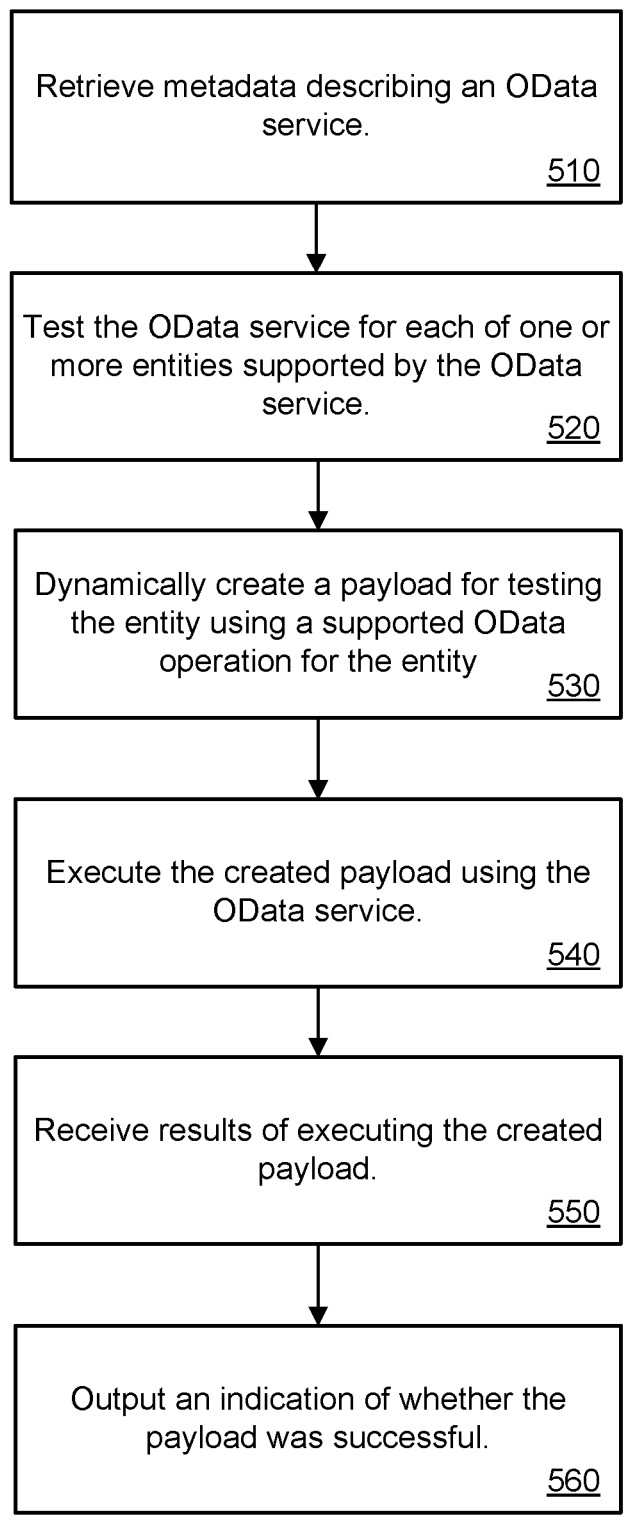
FIG. 5 is a flowchart of an example process for automated payload testing of OData APIs using dynamically created payloads.

FIG. 5 is a flowchart depicting an example process 500 for testing OData APIs. At 510, metadata is received that describes an OData service. The OData service is associated with an OData API. The metadata indicates the entities, fields, and field values associated with the OData service. The metadata can indicate other information as well, such as which OData operations (e.g., create, read, update and/or delete) are supported for each entity.

At 520, the OData service is tested for each of one or more entities supported by the OData service. Testing involves performing the operations depicted at 530, 540, 550, and 560, which operations are performed for each of the one or more entities that are being tested.

At 530, a payload is dynamically created for testing an entity using an OData operation supported by the entity. For example, a payload can be dynamically created for testing a read operation to read a service order entity. While the payload is for testing the service order entity, the payload can include additional entities other than the service order entity (e.g., an associated service order item entity might be included in the payload). Such additional entities may be required for testing and can be determined based on the metadata (e.g., indications of required entity relationships, dependencies, etc.). When creating the payload, various fields and associated field values can be determined (e.g., using actual and/or generated data for the field values).

At 540, the payload is executed using the OData service. For example, executing the payload can comprise sending the payload to the OData service using an OData request (e.g., via a URI for the OData service that specifies the OData command and the payload). The OData service receives and processes the OData request, including the payload. For example, the OData service creates, reads, updates, or deletes a resource based on the OData operation and the payload.

At 550, results of executing the created payload are received. The results indicate whether the payload was successfully executed by the OData service. In some implementations, the results comprise an HTTP status code, and/or a performance result.

At 560, an indication of whether the payload was successfully executed by the OData service is output. For example, the indication can be based on an HTTP status code and/or performance result. An indication of success can be saved (e.g., in a database or log), presented to a user (e.g., in a graphical user interface used for testing), output in a report, sent as an alert, or output in another manner. In some implementations, successful payloads are saved for later use (e.g., for periodic and/or triggered execution).

Figure 6:
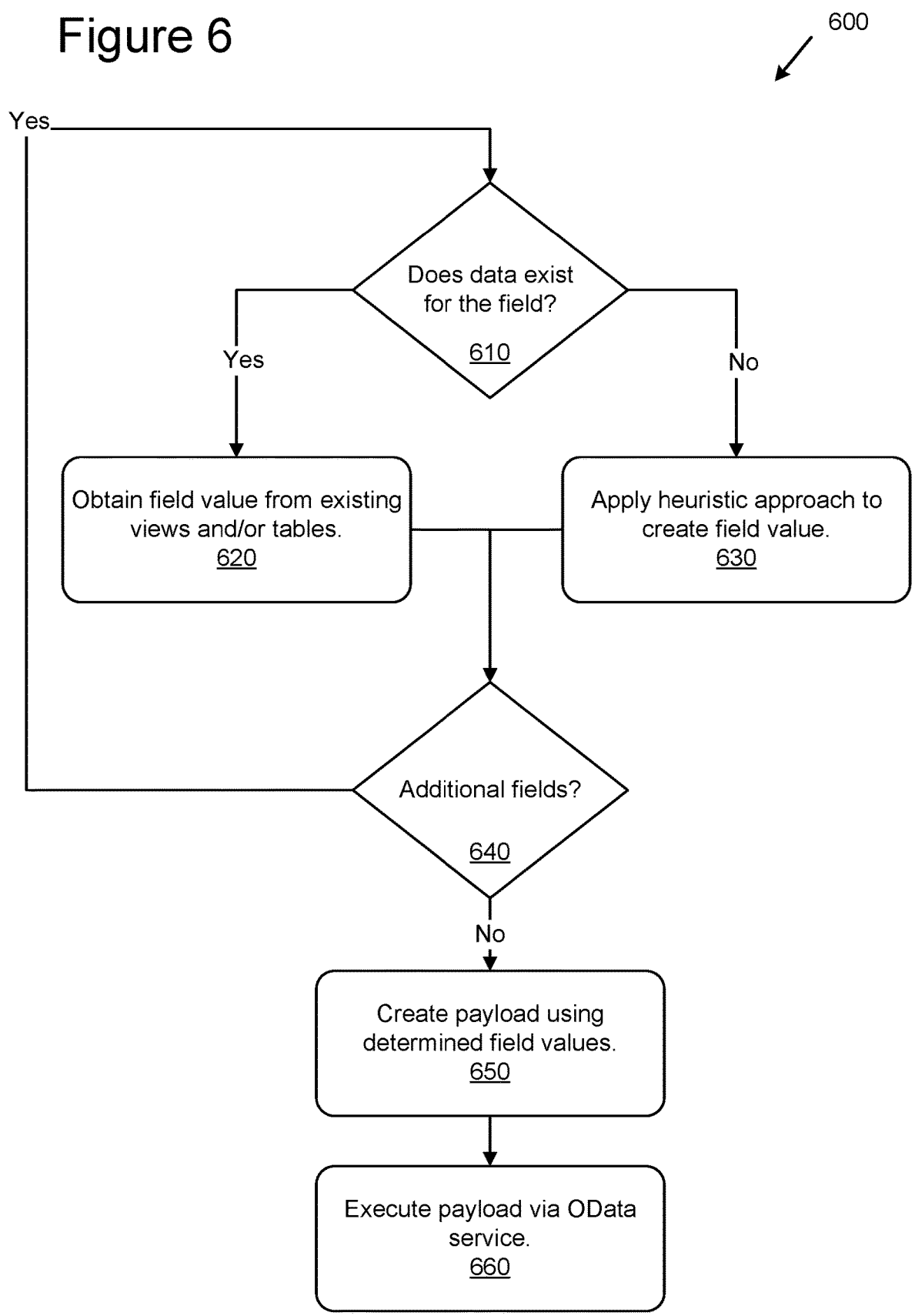
FIG. 6 is a diagram depicting an example flowchart for determining field values for creating payloads used to test OData services.

FIG. 6 is a diagram depicting an example flowchart 600 for determining field values for creating payloads used to test OData services. The example flowchart 600 can be followed for each field to be included in a given payload. At 610, a field is checked to determine if actual data exists for the field (e.g., in a view and/or in the database). If it does, then the process proceeds to 620, where the field values is obtained from the existing data (e.g., from the existing views and/or database tables). However, if actual data does not exist for the field (e.g., if there is no existing data for the field in the view and/or database tables of the system), then the process proceeds to 630 where a heuristic approach is applied to create a value for the field. In some implementations, the heuristic approach uses the simulated annealing algorithm.

At 640, if there are additional fields that are included in the payload, then the process returns to 610 to determine a value for the next field. Otherwise (if values have been determined for all fields to be included in the payload), then the process proceeds to 650, where the payload is created using the determined field values. Then, at 660, the created payload is executed using the OData service.

Computing Systems

Figure 7:
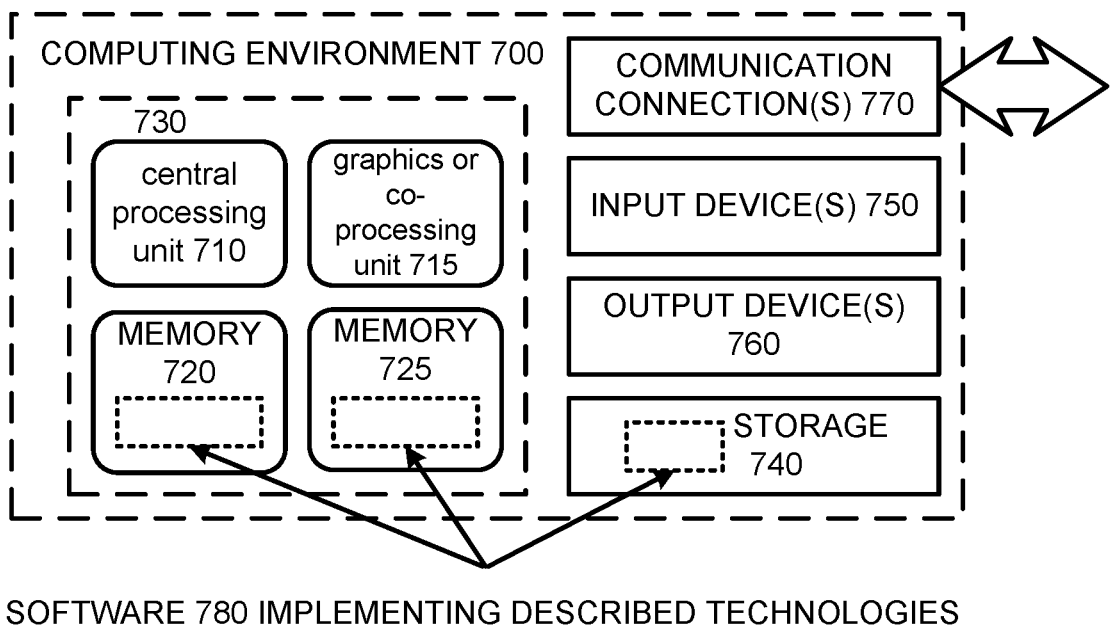
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud Computing Environment

Figure 8:
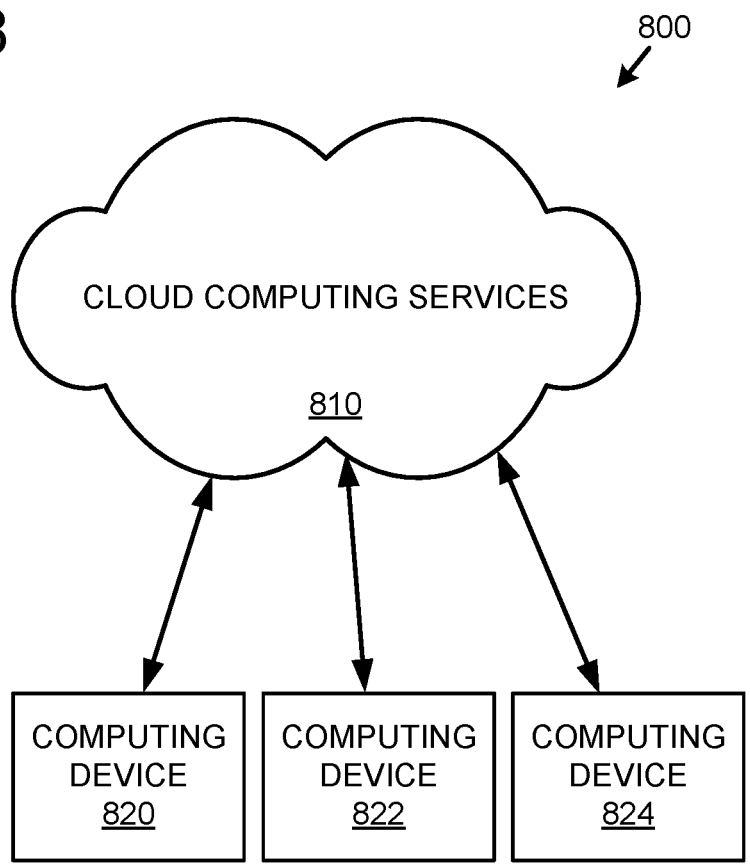
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, database resources, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operators (e.g., data processing, data storage, and the like).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, performed by one or more computing devices, for automated payload testing of open data protocol (OData) application programming interfaces (APIs), the method comprising:
    retrieving, from an OData service, metadata describing the OData service, wherein the OData service is associated with an OData API; and
    testing the OData service for each of one or more entities of the OData service, comprising:
    dynamically creating a payload for testing the entity of the OData service, wherein the payload is for testing a supported OData operation for the entity;
    executing the payload using the OData service;
    receiving results of executing the payload using the OData service, wherein the results comprise a hypertext transfer protocol (HTTP) status code; and
    outputting an indication of whether the payload was successfully executed by the OData service based at least in part on the HTTP status code.

2. The method of claim 1, wherein the supported OData operation for the entity is one of:
    a first operation to create a resource for the entity;
    a second operation to read a resource for the entity;
    a third operation to update a resource for entity; or
    a fourth operation to delete a resource for the entity.

3. The method of claim 1, wherein the metadata describes information comprising:
    entities associated with the OData service;
    fields associated with each of the entities; and
    a data type for each of the fields.

4. The method of claim 1, wherein the dynamically creating a payload, executing the payload, receiving results, and outputting an indication of whether the payload was successfully executed is performed for each supported OData operation for the entity.

5. The method of claim 1, wherein the dynamically creating a payload for testing the entity of the OData service comprises:

for each of one or more fields of the entity that have existing data in a database table or view, using the existing data to populate values for the one or more fields in the payload.

6. The method of claim 1, wherein the dynamically creating a payload for testing the entity of the OData service comprises:
for each of one or more fields of the entity that have existing data in a database table or view, using the existing data to populate values for the one or more fields in the payload; and
for each of one or more fields of the entity that do not have existing data in a database table, generating data to fill in the one or more fields in the payload.

7. The method of claim 1, wherein testing the OData service is performed, for each of the one or more entities, using an iterative procedure, comprising:
for a first iteration, creating the payload using only key fields and associated field values, and if the payload is successfully executed by the OData service, ending the iterative procedure; and
otherwise, performing one or more additional iterations until a payload is successfully executed by the OData service, comprising:
creating another payload for the additional iteration that includes one additional field and associated field value; and
executing the another payload.

8. The method of claim 1, wherein an HTTP status code in the 400s or 500s indicates a failed OData request, and wherein an HTTP status code in the 200s indicates that the payload was successfully executed by the OData service.

9. The method of claim 1, wherein the results of executing the payload using the OData service further comprise a performance result indicating how long the OData service took to execute the payload, and wherein the indication of whether the payload was successfully executed by the OData service is further based, at least in part, on the performance result.

10. The method of claim 9, wherein the created payload is successfully executed by the OData service when:
the HTTP status code is in the 200s; and
the performance result is less than a performance threshold.

11. The method of claim 1, further comprising:
upon successful execution of the payload by the OData service, saving the payload;
wherein the saved payload is executed on a periodic basis to test the OData service.

12. The method of claim 1, further comprising:
upon successful execution of the payload by the OData service, saving the payload; and
upon receiving an indication that the OData service has been updated, triggering execution of the saved payload to test the updated OData service.

13. One or more computing devices comprising:
processors; and
memory;
the one or more computing devices configured, via computer-executable instructions, to perform operations implementing automated payload testing of open data protocol (OData) application programming interfaces (APIs), the operations comprising:
retrieving, from an OData service, metadata describing the OData service, wherein the OData service is associated with an OData API; and
testing the OData service for each of one or more entities of the OData service, comprising:
dynamically creating a payload for testing the entity of the OData service, wherein the payload tests a supported OData operation for the entity;
executing the payload using the OData service;
receiving results of executing the payload using the OData service, wherein the results comprise a hypertext transfer protocol (HTTP) status code; and
outputting an indication of whether the payload was successfully executed by the OData service based at least in part on the HTTP status code.

14. The one or more computing devices of claim 13, wherein the supported OData operation for the entity is one of:
a first operation to create a resource for the entity that is performed using a first HTTP request method;
a second operation to read a resource for the entity that is performed using a second HTTP request method;
a third operation to update a resource for entity that is performed using a third HTTP request method; or
a fourth operation to delete a resource for the entity that is performed using a fourth HTTP request method.

15. The one or more computing devices of claim 13, wherein the dynamically creating a payload, executing the payload, receiving results, and outputting an indication of whether the payload was successfully executed is performed for each supported OData operation for the entity.

16. The one or more computing devices of claim 13, the operations further comprising:
upon successful execution of the payload by the OData service, saving the payload; and
on a periodic basis:
sending the saved payload to the OData service for execution;
receiving results of executing the saved payload; and
outputting an indication of whether the saved payload was executed successfully by the OData service based at least in part on the results of executing the saved payload.

17. The one or more computing devices of claim 13, the operations further comprising:
receiving, via a graphical user interface from a user, a service execution sequence that comprises indications of a plurality of OData services;
wherein the operations are performed for each OData service of the plurality of OData services.

18. One or more computer-readable storage media storing computer-executable instructions for execution on one or more computing devices to perform operations for automated payload testing of open data protocol (OData) application programming interfaces (APIs), the operations comprising:
retrieving, from an OData service, metadata describing the OData service, wherein the OData service is associated with an OData API; and
testing the OData service for each of one or more entities of the OData service, and for each OData operation that is supported for each entity, comprising:
dynamically creating a payload for testing the entity of the OData service, wherein the payload is for testing the supported OData operation for the entity;
executing the payload using the OData service, wherein executing the payload using the OData service comprises sending the payload to the OData service using an OData request that specifies an OData command and the payload;

receiving results of executing the payload using the OData service, wherein the results comprise a hypertext transfer protocol (HTTP) status code; and outputting an indication of whether the OData request was successful based at least in part on the HTTP status code.

19. The one or more computer-readable storage media of claim 18, wherein the dynamically creating a payload for testing the entity of the OData service comprises:

for each of one or more fields of the entity that have existing data in a database table or view, using the existing data to populate values for the one or more fields in the payload; and for each of one or more fields of the entity that do not have existing data in a database table or view, generating data to fill in the one or more fields in the payload using a heuristic approach.

20. The one or more computer-readable storage media of claim 18, the operations further comprising:

upon successful execution of the payload by the OData service, saving the payload;

wherein the saved payload is executed on a periodic basis to test the OData service.

* * * * *